(12) United States Patent
Wilson (10) Patent No.: US 10,595,511 B2
(45) Date of Patent: Mar. 24, 2020

(54) ANIMAL TOY

(71) Applicant: Doskocil Manufacturing Company, Inc., Arlington, TX (US)

(72) Inventor: Chris Wilson, Plano, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 0 days.

(21) Appl. No.: 16/367,728

(22) Filed: Mar. 28, 2019

(65) Prior Publication Data

US 2019/0223411 A1 Jul. 25, 2019

Related U.S. Application Data

(63) Continuation of application No. 15/395,182, filed on Dec. 30, 2016, now Pat. No. 10,390,517, which is a continuation-in-part of application No. 15/285,921, filed on Oct. 5, 2016, now abandoned.

(60) Provisional application No. 62/237,005, filed on Oct. 5, 2015.

(51) Int. Cl.
| | |
|---|---|
| *A01K 15/02* | (2006.01) |
| *A01K 5/02* | (2006.01) |
| *B60L 15/20* | (2006.01) |
| *F16H 1/20* | (2006.01) |

(52) U.S. Cl.
CPC ............. *A01K 15/027* (2013.01); *A01K 5/02* (2013.01); *A01K 15/021* (2013.01); *A01K 15/025* (2013.01); *B60L 15/2036* (2013.01); *B60L 2240/42* (2013.01); *B60L 2240/461* (2013.01); *B60Y 2200/81* (2013.01); *F16H 1/20* (2013.01); *Y02T 10/7258* (2013.01)

(58) Field of Classification Search
CPC .. A01K 15/021; A01K 15/025; A01K 5/0114; A63H 33/003; A63H 17/02; A63H 33/005
USPC ...... 119/702, 707, 710, 57.92; 446/431, 448
See application file for complete search history.

(56) References Cited

U.S. PATENT DOCUMENTS

| | | | |
|---|---|---|---|
| 4,310,987 A | 1/1982 | Chieffo | |
| 4,391,224 A | 7/1983 | Adler | |
| 4,897,070 A | 1/1990 | Wagstaff | |
| 5,191,856 A * | 3/1993 | Gordon | ................ A01K 15/025 119/711 |
| 5,390,629 A * | 2/1995 | Simone | ................ A01K 15/025 119/711 |
| 5,769,441 A | 6/1998 | Namngani | |

(Continued)

*Primary Examiner* — Yvonne R Abbott-Lewis
(74) *Attorney, Agent, or Firm* — Global IP Counselors, LLP (57) ABSTRACT

An animal toy includes an elongated body portion having a first end and a second end. A first wheel is disposed on a first rotating member adjacent the first end, the first rotating member extending in a first direction, the first wheel having a first opening disposed in the first direction. A second wheel is disposed on a second rotating member adjacent the second end, the second axle extending in a second axial direction, the second wheel having a second opening disposed in the second direction. A first electric motor is configured to drive the first wheel. The second electric motor is configured to drive second wheel independently. A controller is programmed to control the first electric motor to control the rotational direction of the first wheel and control the second electric motor to control the rotational direction of the second wheel.

16 Claims, 7 Drawing Sheets

(56) References Cited

U.S. PATENT DOCUMENTS

| | | | |
|---|---|---|---|
| 5,871,386 A | 2/1999 | Bart | |
| 6,158,391 A * | 12/2000 | Simonetti | A01K 5/0114 |
| | | | 119/702 |
| 6,439,948 B1 | 8/2002 | Ostendorff | |
| 6,860,346 B2 | 3/2005 | Burt | |
| 7,056,185 B1 | 6/2006 | Anagnostou | |
| 7,217,170 B2 * | 5/2007 | Moll | A63H 33/003 |
| | | | 446/164 |
| 7,347,761 B2 | 3/2008 | Rowe et al. | |
| 7,458,876 B2 | 12/2008 | Laurienzo | |
| 7,631,613 B2 * | 12/2009 | Lescroart | A01K 15/025 |
| | | | 119/51.01 |
| 8,006,643 B2 | 8/2011 | Xu et al. | |
| 8,197,298 B2 * | 6/2012 | Willett | A63H 17/02 |
| | | | 17/2 |
| 8,307,923 B2 * | 11/2012 | Lin | B62D 57/024 |
| | | | 180/8.3 |
| 8,496,077 B2 * | 7/2013 | Nesnas | B25J 5/007 |
| | | | 180/7.5 |
| 9,045,177 B2 * | 6/2015 | Chou | B62D 57/022 |
| 9,526,998 B2 | 12/2016 | Hudson | |
| 9,829,882 B2 * | 11/2017 | MacGregor | G05D 1/0011 |
| D825,116 S * | 8/2018 | Wills | D30/160 |
| 10,124,483 B1 * | 11/2018 | Cotton | B62D 61/00 |
| 10,159,220 B1 * | 12/2018 | Tsengas | A01K 15/024 |
| 2008/0083378 A1 * | 4/2008 | Pearce | A01K 5/0114 |
| | | | 119/707 |
| 2010/0024740 A1 | 2/2010 | Grepper | |
| 2014/0267720 A1 | 9/2014 | Miller | |
| 2017/0064926 A1 | 3/2017 | Gutierrez | |

\* cited by examiner

ANIMAL TOY

CROSS-REFERENCE TO RELATED APPLICATIONS

This application is a continuation of U.S. patent application Ser. No. 15/395,182, filed Dec. 30, 2016, which is a continuation-in-part of U.S. patent application Ser. No. 15/285,921, filed Oct. 5, 2016, which claims benefit of U.S. Provisional Application No. 62/237,005, filed Oct. 5, 2015, the contents of each which are hereby incorporated herein by reference.

BACKGROUND

Field of the Invention

The present invention generally relates to an animal toy. More specifically, the present invention relates to a motorized animal toy that can provide interactive play between the owner and the animal.

Background Information

A long-standing practice exists for providing toys for animals. In particular, many animals, such as dogs, enjoy chasing or retrieving various types of objects such as sticks, balls, flying discs, and the like. Many breeds have an enhanced enjoyment in "playing fetch" in that such activities have been bred into such lines. Retrievers, bird dogs or gun dogs have been bred to retrieve game foul, spaniels to flush birds from the brush, and other such similar activities. Typically, such breads can be entertained by retrieving a flying disc made from a plastic material.

SUMMARY

It has been found that a need exists for a toy that enables improved retrieving or chasing games for an animal. In particular, it has been found that a need exists for a motorized animal toy that enables any user to play a continuous chase game with an animal without the owner growing tired. Moreover, a need exists to improve a functional dog toy that provides interactive play between the owner and their dog.

An animal toy includes an elongated body portion having a first end and a second end. A first wheel is disposed on a first rotating member adjacent the first end, the first rotating member extending in a first direction, the first wheel having a first opening disposed in the first direction. A second wheel is disposed on a second rotating member adjacent the second end, the second axle extending in a second axial direction, the second wheel having a second opening disposed in the second direction. A first electric motor is configured to drive the first wheel. The second electric motor is configured to drive second wheel independently. A controller is programmed to control the first electric motor to control the rotational direction of the first wheel and control the second electric motor to control the rotational direction of the second wheel.

In another aspect, an animal toy comprises an elongated body portion having a first end and a second end. A first wheel is disposed on a first axle adjacent the first end, the first axle extending in a first axial direction, the first wheel having a first opening disposed in the first axial direction. A second wheel is disposed on a second axle adjacent the second end, the second axle extending in a second axial direction, the second wheel having a second opening disposed in the second axial direction. A first electric motor is configured to drive the first wheel via the first axle. A second electric motor is configured to drive second wheel via the second axle. A controller is programmed to control the first electric motor to control the rotational direction of the first wheel and control the second electric motor to control the rotational direction of the second wheel.

DETAILED DESCRIPTION OF EMBODIMENTS

Selected embodiments will now be explained with reference to the drawings. It will be apparent to those skilled in the art that the motorized animal toy 10 improves fetch with an animal. Moreover, the motorized animal toy 10 can increase playtime due to the increased movement of the toy 10.

Figure 1:
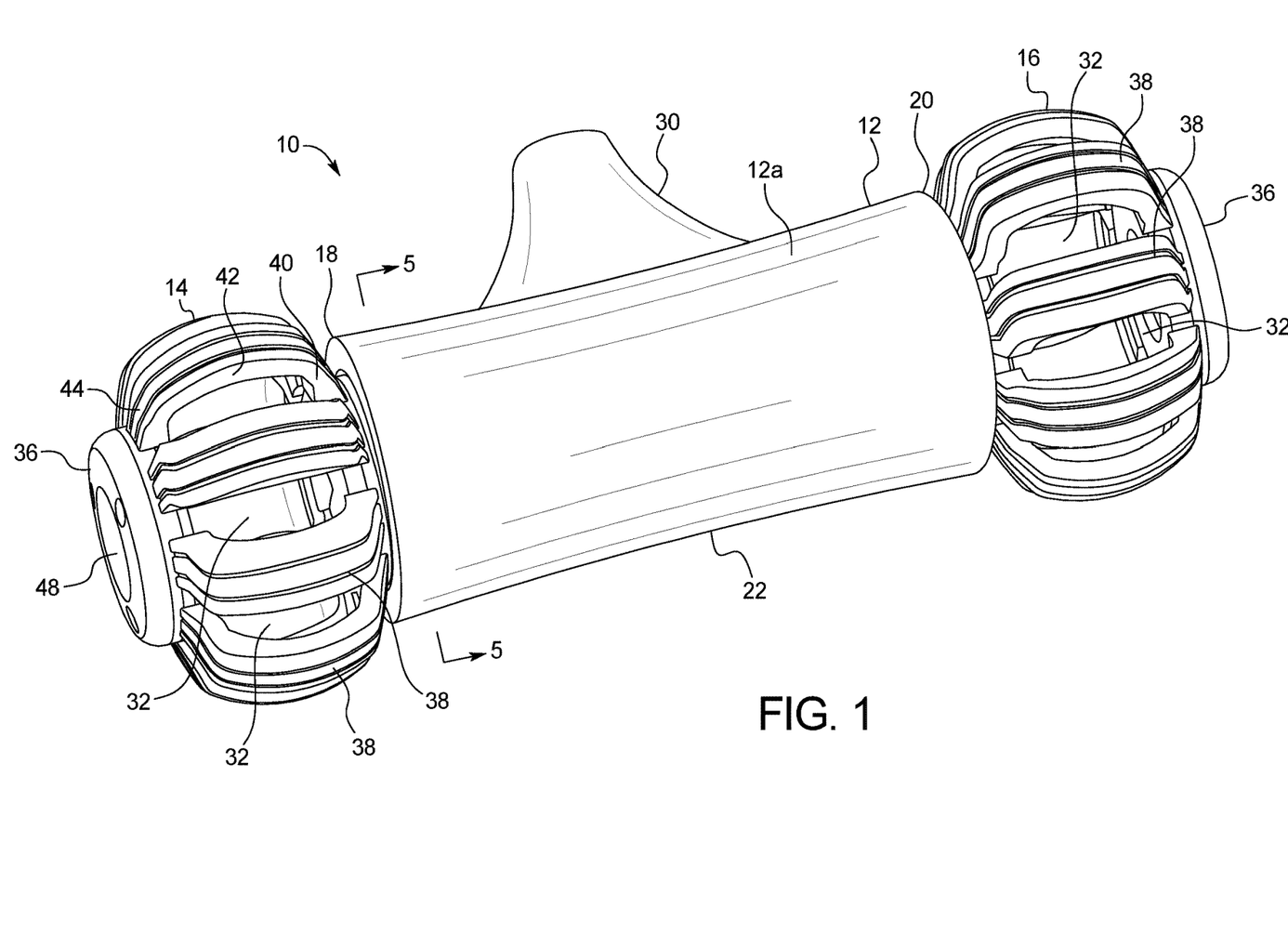
FIG. 1 illustrates a top view of a motorized animal toy according to a first embodiment of the present invention.
Figure 2:
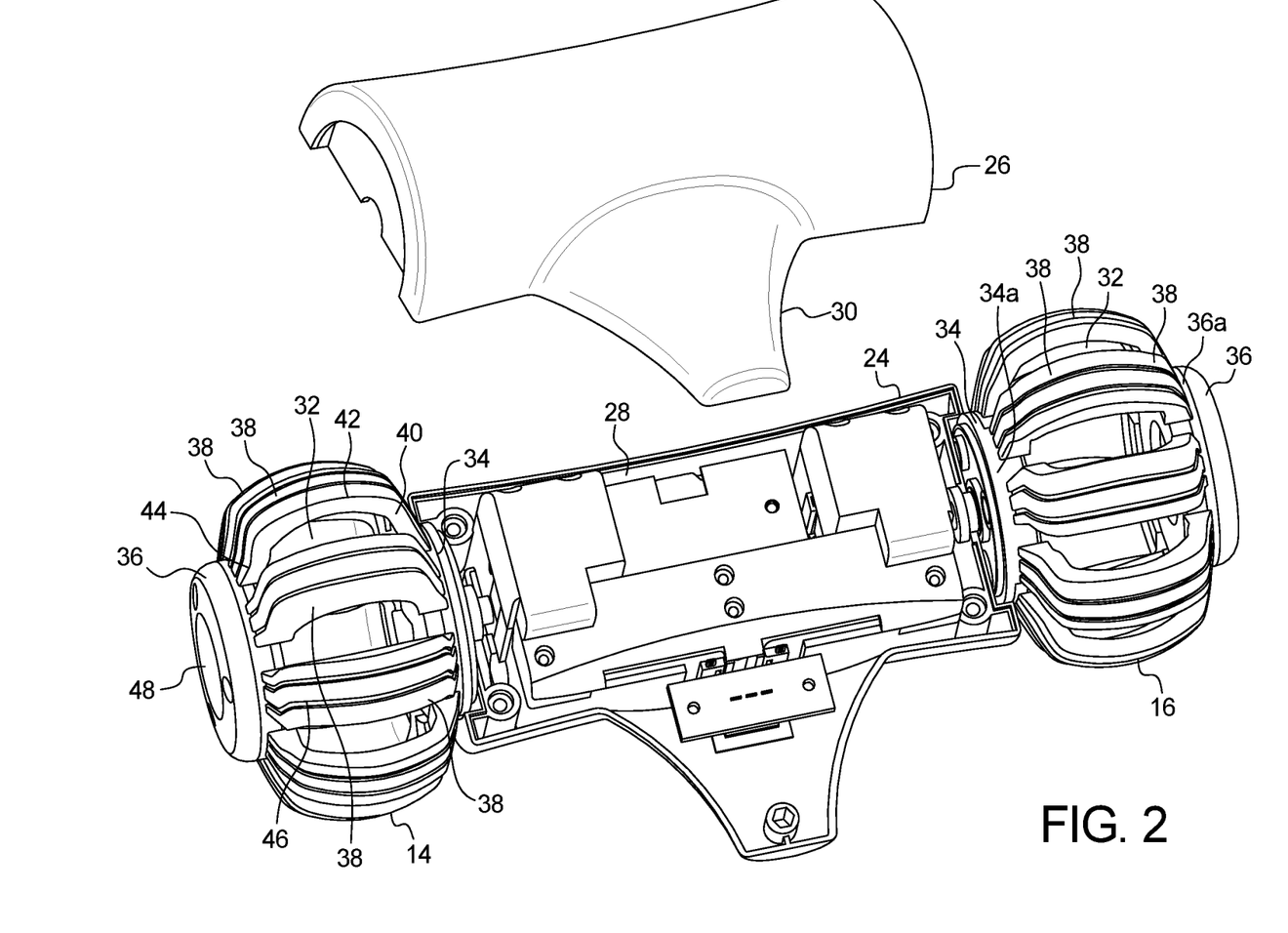
FIG. 2 is an exploded perspective view of the motorized animal toy of FIG. 1.
Figure 3:
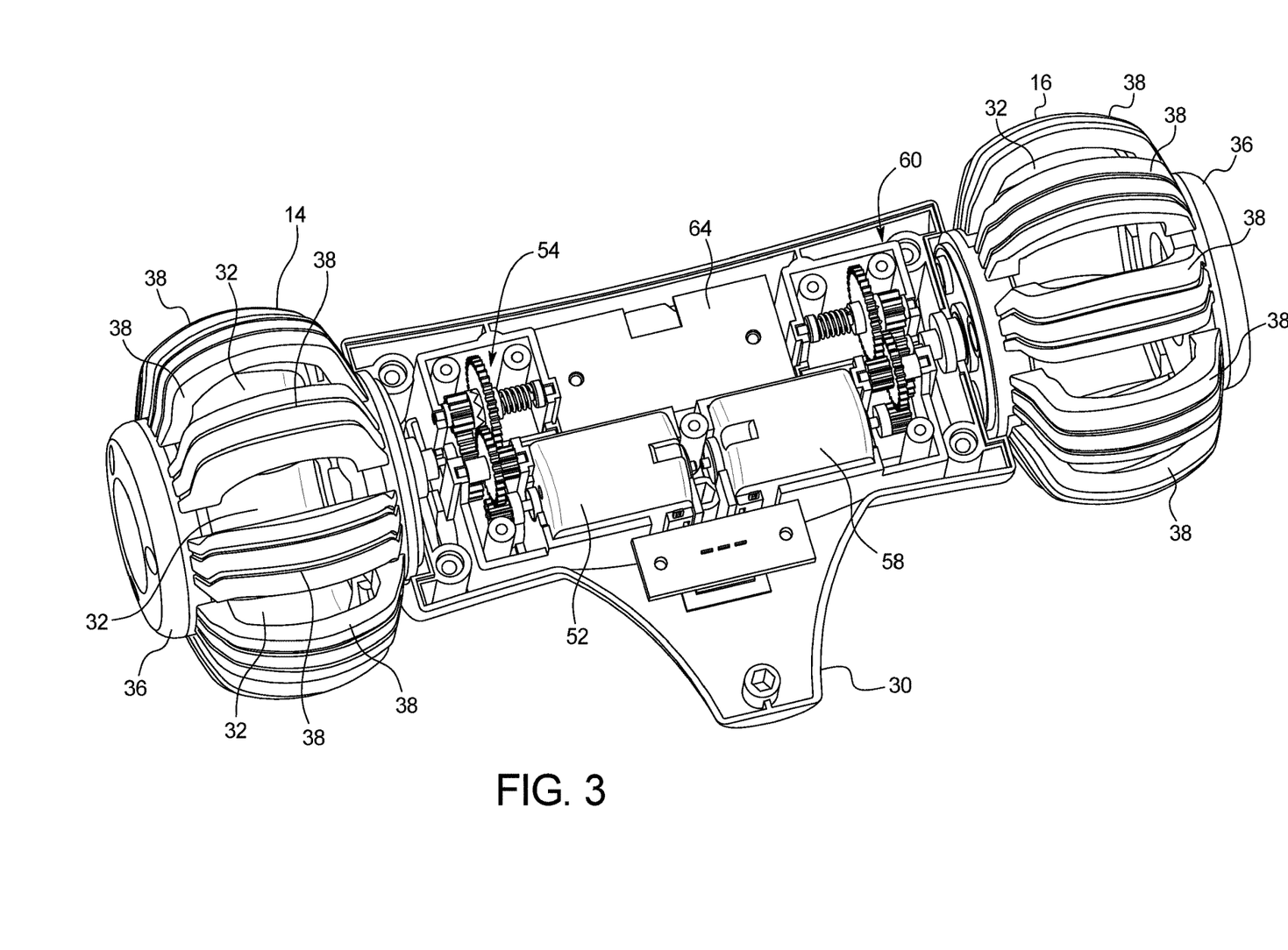
FIG. 3 is a top view of motorized animal toy of FIG. 1 with the components covers removed.

As shown in FIGS. 1-3, preferably the motorized animal toy 10 is a generally plastic or rubber toy. However, the motorized animal toy 10 can be any suitable material. The motorized animal toy 10 can be designed to replicate a bone (or any other configuration) and be easy to grip for an animal.

The motorized animal toy 10 includes a body portion 12 and at least two wheels 14 and 16 (i.e., a first wheel 14 and a second wheel 16). Preferably the wheels are disposed on opposite ends (i.e., first end 18 and second end 20) of the body portion 12. The body portion 12 can be an elongated body portion 12 that is generally cylindrical with each of the ends having a slightly larger diameter than the central portion 22 of the body portion 12. However, is noted that the body portion 12 can have any suitable configuration and the ends do not necessarily need to have a larger diameter than the central portion. The body portion 12 is preferably a housing that has a first portion 24 and a second portion 26. The first portion 24 can be detachable from the second portion 26 to enable access to the interior 28 of the body portion 12 and/or the interior components housed with the body portion 12. The first and second portions 24 and 26 of the body portion 12 can be coupled together in any suitable manner (e.g., screws or in any other suitable manner).

The body portion 12 can include a protrusion 30 that extends radially outwardly from the outer circumferential surface 12a of the body portion 12. In one embodiment, the protrusion 30 can have a generally trapezoidal configuration with the wider portion being adjacent to the circumferential surface of the body portion 12. The protrusion 30 can be configured and sized to prohibit the body portion 12 from spinning when the wheels spin. Thus, the protrusion 30 is configured to facilitate movement of the motorized animal toy 10.

The body portion 12 is generally constructed to be rugged and durable for outdoor use, so as to be capable of driving or moving on various surfaces, such as grass other tough terrain. Moreover, the toy 10 is water resistant or water proof so as to protect against dog slobber, rain or entry into water. In this embodiment, the body portion 12 can be generally smooth or have any suitable texture thereon. However, in some embodiments, the body portion 12 can have ribs or grooves running in a longitudinal direction. In this embodiment, the ribs or grooves can extend entirely along the body portion 12 or have smooth areas separating the grooves or ribs. In this embodiment, the smooth portions have a radius that is less than the height of the ribs.

The wheels are generally disposed on either end of the body portion 12. That is, the first wheel is generally disposed on the first end and the second wheel is generally disposed on the second end. The first and second ends preferably have the same diameter, which is generally equal to or larger than the diameter of the body portion 12. Moreover, the first and second wheels generally have the same diameter which can be larger than the diameter of the first and second ends of the body portion 12. In one embodiment, the first and second wheels each include a plurality of openings 32. Each of the plurality of openings are preferably configured to enable food to pass therethrough.

As shown in FIGS. 2 and 3, each of the first and second wheels includes an inner hub 34 member, an outer hub member 36, and a plurality of axially extending members 38 extending between the inner hub member 34 and the outer hub member 26. The axially extending members 38 are adjacent to and spaced from each other so as to form the plurality of openings 32. Thus, as is understood, each of the plurality of openings 32 is disposed between adjacent members of the plurality of axially extending members 38. In one embodiment, the axially extending members 38 are generally U-shaped when viewed from the side. That, each of the axially extending members 38 includes a first radially extending portion 40, an axially extending portion 42 and a second radially extending portion 44. The first radially extending portion 40 is attached to an outer circumferentially facing surface 34a of the inner hub member 34 and extends generally in outwardly radial direction. The first radially extending portion 40 curves as it transitions into the axially extending portion 42, which can be arcuate. The axially extending portion 42 generally extends in an axial direction relative to the inner hub member 34 and the body portion 12 and in a direction away from the inner hub member 34. The axially extending portion 42 curves as it transitions into the second radially extending portion 44. The second radially extending portion 44 is attached to an outer circumferentially facing surface 36a of the outer hub member 36 and extends generally in outwardly radial direction. In one embodiment, the axially extending members 38 have grooves 46 thereon. As can be seen in FIGS. 1 and 2, the axially extending members 38 form the openings 32, such that the openings 32 are longitudinal spaces between the inner and outer hub members 34 and 36.

The inner and outer hub members 34 and 36 are preferably disk shaped members. Moreover, the outer hub members 36 can have an opening 48 disposed therein. It is noted that the inner and outer hub members 34 and 36 can have any configuration desired, as long as they enable rotation of the wheels 14 and 16.

As shown in FIGS. 3-6, the interior 28 of the body portion 12 includes the internal components for driving the toy 10. In one embodiment, the internal components include a power source 50, a first motor 52, first gear set or system 54, a first drive axle (rotating member) 56, a second motor, a second gear set or system 60, a second drive axle (rotating member) 62, and a controller 64. The power source 50 can be any suitable power source 50 such as a battery or a plurality of batteries. Preferable, the device is powered using a rechargeable battery with water resistant charging port. The first and second motors 52 and 54 are preferably electric motors and are coupled to the power source 50.

Figure 4:
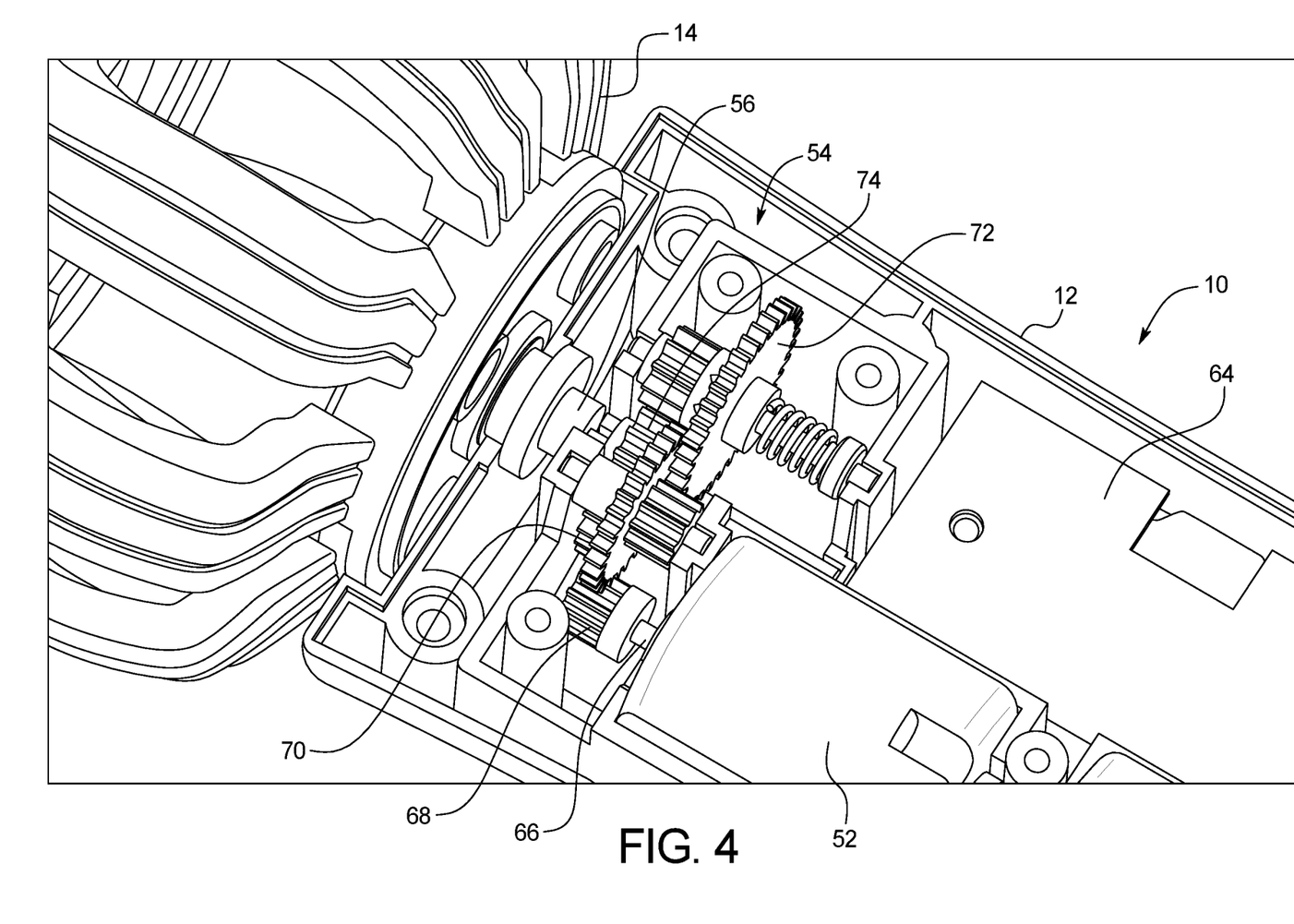
FIG. 4 is an enlarged view of the gear system illustrated in FIG. 3.
Figure 5:
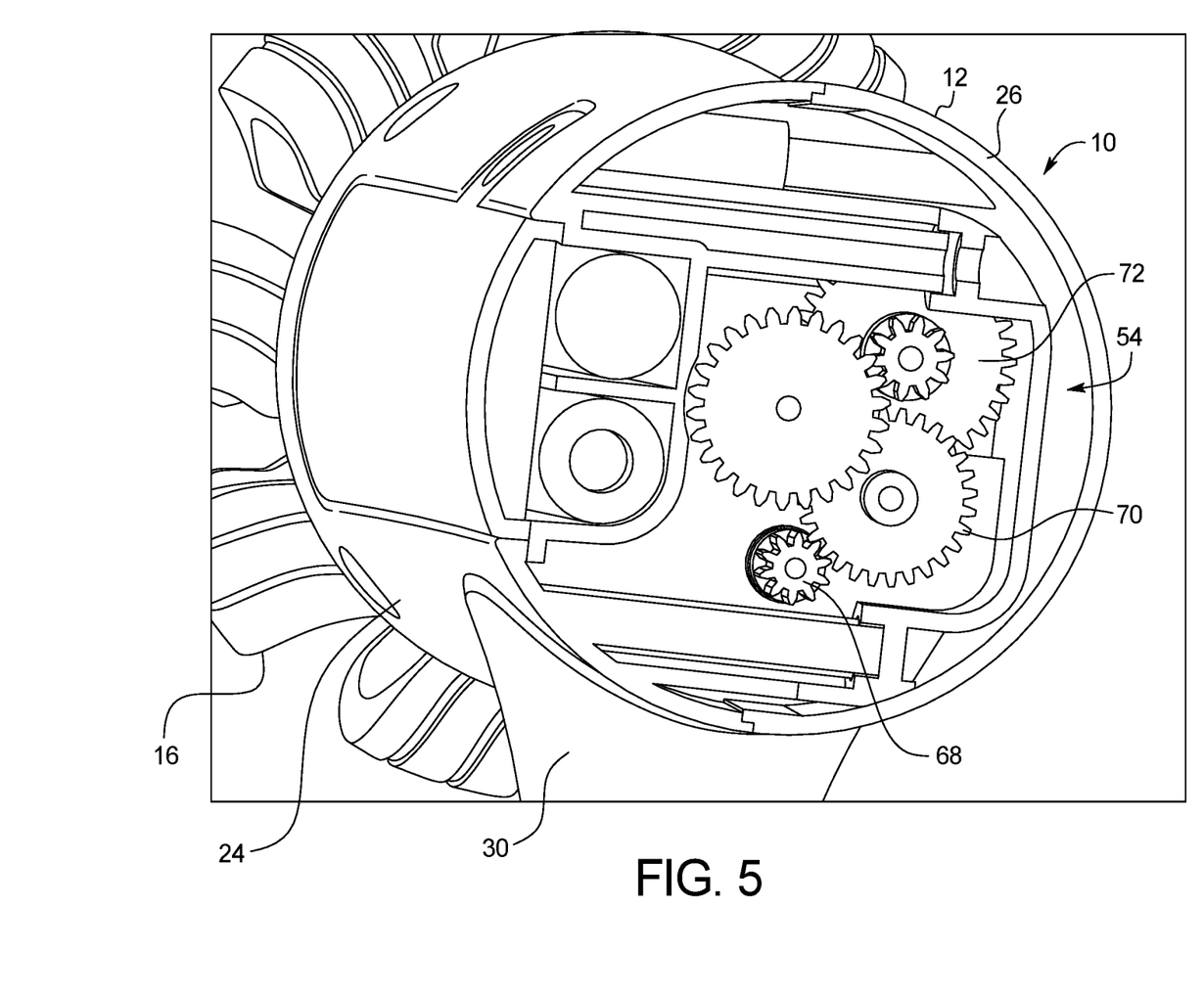
FIG. 5 is a cross sectional view of the gear system taken along lines 5-5 of FIG. 1.

As shown in FIG. 4, each of the first and second motors 52 and 54 includes an output shaft 66 that is connected to a first gear 68 in a respective gear set. The output shaft 66 of each motor rotates causing the first gear 68 to rotate, the first gear 68 in each gear set meshes with another gear 70. Each gear set includes a plurality of gears (of which, at least one can be a reduction gear 72) which ends with a second gear 74 coupled to a respective drive axle. The drive axles are in turn coupled to the inner hub members.

Figure 6:
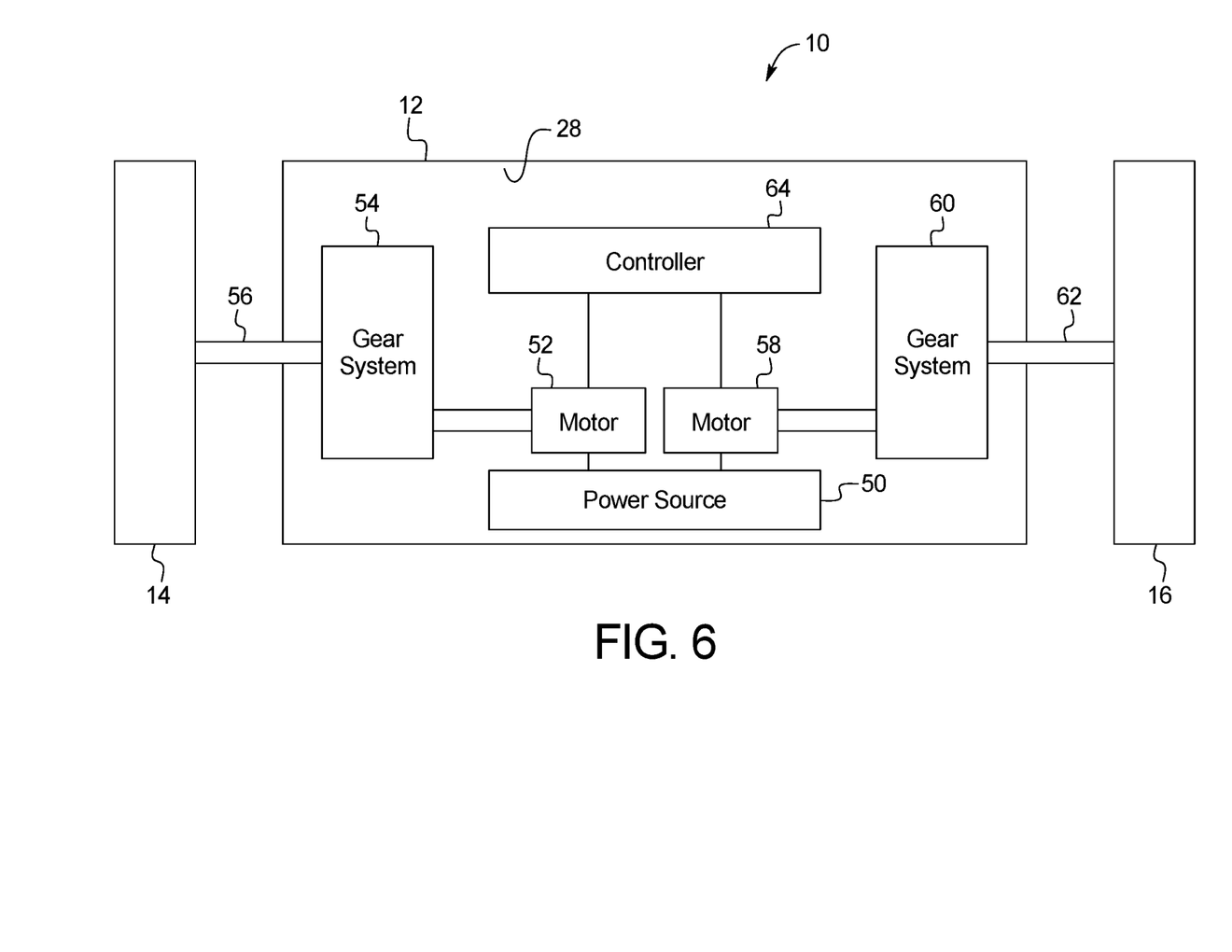
FIG. 6 is a schematic view of the control system of the motorized animal toy of FIG. 1.

The controller 64 can include a printed circuit board and is configured to control the speed and direction of the motors 52 and 54. In one embodiment, the controller 64 can randomly select a direction (clockwise or counterclockwise) for each wheel and a speed of rotation. Thus, the toy 10 can randomly move and turn to increase the enjoyment for the pet. The controller 64 can also have a preset or predetermined constant or variable speed and wheel direction. For example, in one embodiment, the first and second wheels 14 and 16 can rotate in the same direction and at the same speed to move away at a high rate of speed from the animal. In other embodiments, the speed and direction of the wheels 14 and 16 can enable the toy 10 to turn in a predetermined direction or follow a predetermined course or pattern.

The first and second wheels 14 and 16, in combination with the first and second motors 52 and 54 and the first and second gear sets 54 and 60 are preferably capable of producing a large torque to enable the toy 10 to be driven over rough terrain. Moreover, the first and second motors 52 and 54 and first and second gear sets 54 and 60 enable independent control of the first and second wheels 14 and 16. This configuration enables the toy 10 to have a simple tank control method for movement and steering. That is, to move the toy 10 in a specific direction both wheels 14 and 16 turn at the same rate. To turn the toy 10, one wheel moves more slowly or in the opposite direction of the other wheel. Such control of the wheels 14 and 16 in performed by the controller 64. As is understood, the controller 64 can be programmed to randomly turn each of the wheels, or be programmed to move the toy 10 in a predetermined manner. This structure also enables the toy 10 to drive even if flipped over or dropped by the owner or animal. Moreover, the structure enables an animal to easily grab the body portion 12.

In some embodiments, the wheels 14 and 16 have basically the same radius as the ends 18 and 20 of the body portion 12—i.e., the portions of the body portion 12 immediately adjacent the wheels. Additionally, if desired, the wheels 14 and 16 can be closed and have ribs thereon; however, ribs are not necessarily required. In this embodiment, the wheels are generally disk shaped and rotate relative to the body portion 12. As discussed above, the wheels can rotate independently of each other to enable steering of the toy 10.

In some embodiments, the wheels 14 and 16 can be generally spherically shaped, and have a radius that is larger than the ends 18 and 20 of the body portion 12. Moreover, the wheels 14 and 16 can have spider webbed configuration with holes in the outer surface thereof. Thus, the wheels 14 and 16 can be generally hollow with access to the hollow interior of the wheels 14 and 16 through one or more openings in the surface of the wheels 14 and 16. Such a configuration can enable the introduction of treats inside of the wheels 14 and 16. The wheels 14 and 16 in this embodiment are preferably rubber allowing for a durable, bouncy structure that enables easy grip and the capability of holding treats, other toys.

Figure 7:
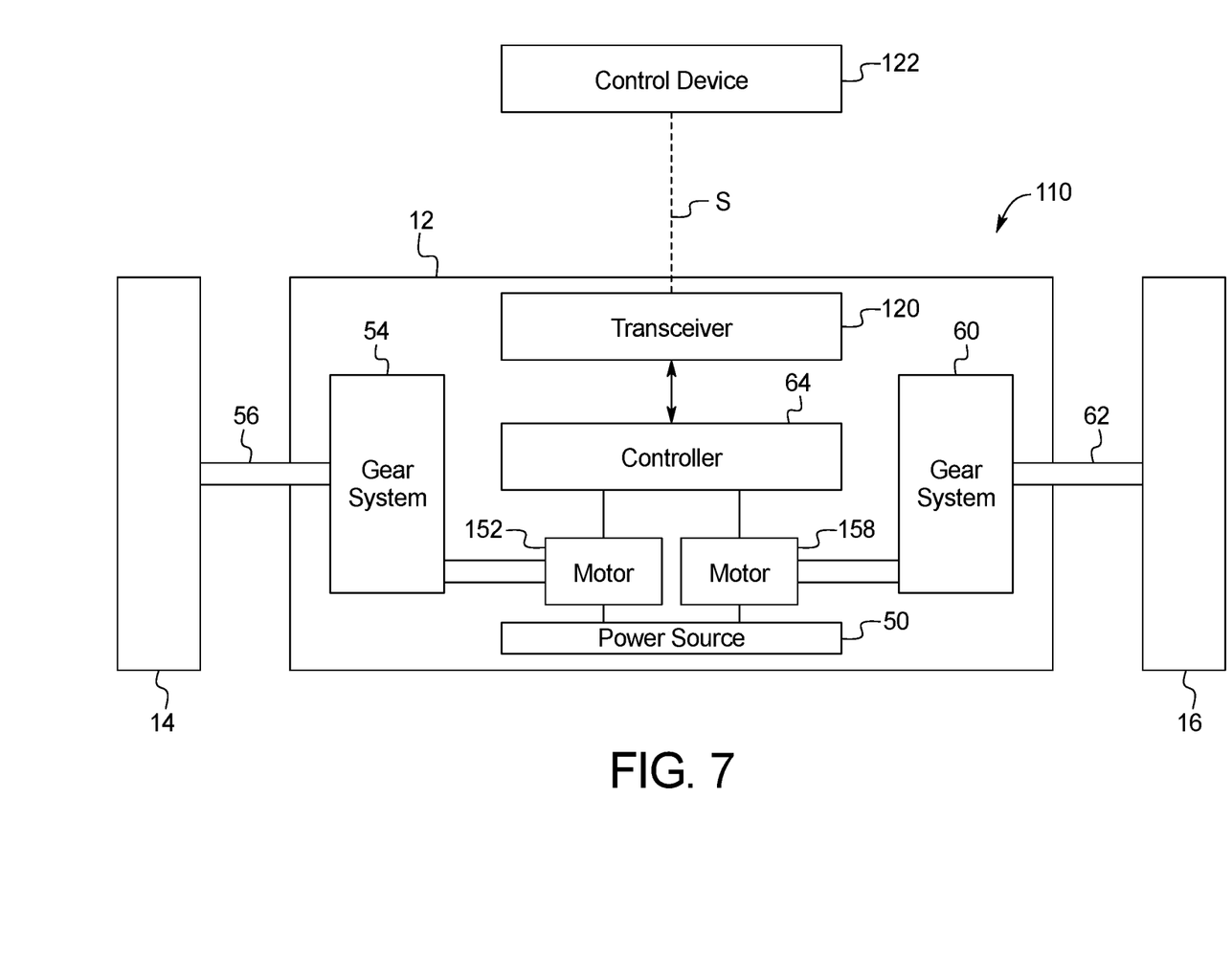
FIG. 7 is a schematic view of the control system of a motorized animal toy according to a second embodiment of the present invention.

In another embodiment, as illustrated in FIG. 7, the toy 110 can be remote controlled. Thus, in one embodiment, the toy 110 includes first and second motors 152 and 158 (or a single motor) that are connected to the wheels and propels the toy 110, as described above. However, in this embodiment, the toy 110 includes a transceiver 120 for communicating with a control device 122.

In this embodiment, the operation of the first and second motors 152 and 158 can be controller 64 via control device 122. In one embodiment, the control device 122 can be a remote control. Such a remote control preferable can have an extended range (e.g., 200 to 300 feet), and uses 2.4 GHz. However, the remote control can be any suitable wireless or wired control device 122. In is noted that the toy 110 does not necessarily need to be remote control and can merely operate using the motor in any desired manner.

The transreceiver (or receiver) 120 is capable of receiving transmitted a signal S from the control device 122 (i.e., a transmitter), and the controller 64 is programmed to control the first and second motors 152 and 158 to vary the rotational speed and direction of each of the first and second wheels 14 and 16 based on the transmitted signal S. That is, the control device 122 can transmit a signal S that instructs the controller 64 to operate the first and second motor to enable the first and second wheels to rotate faster or slower or in opposite directions or in any manner desired. As is understood, the signal S is received by the transreceiver, which is in communication with the controller 64. The controller 64 then controls the motor or motors 152 and 158 or any transmission mechanism to operate the wheels 14 and 16 in the manner intended by the transmitter.

Thus, the animal toy 110 described herein enables improved retrieving or chasing games for an animal. In particular, the animal toy 110 enables any user to play a continuous chase game with an animal without the owner growing tired. Moreover, the animal toy 110 described herein provides interactive play between an owner and their animal or dog.

The power source and motors are conventional components that are well known in the art. Since power source and motors are well known in the art, these structures will not be discussed or illustrated in detail herein. Rather, it will be apparent to those skilled in the art from this disclosure that the components can be any type of structure that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "portion," "member" or "element" when used in the singular can have the dual meaning of a single part or a plurality of parts. Also as used herein to describe the above embodiments, directional terms refer to those directions of the Animal Toy. Accordingly, these terms, as utilized to describe the present invention should be interpreted relative to the Animal Toy.

The term "configured" as used herein to describe a component, section or part of a device includes hardware and/or software that is constructed and/or programmed to carry out the desired function.

The terms of degree such as "generally", as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An animal toy comprising:
   an elongated body portion having a first end and a second end;
   a first wheel disposed on a first rotating member adjacent the first end, the first rotating member extending in a first direction, the first wheel having a first opening disposed in the first direction;
   a second wheel disposed on a second rotating member adjacent the second end, the second axle extending in a second axial direction, the second wheel having a second opening disposed in the second direction, the first and second openings of the first and second wheels being configured to enable food to pass therethrough;
   a first electric motor configured to drive the first wheel;
   a second electric motor configured to drive second wheel independently; and
   a controller programmed to control the first electric motor to control the rotational direction of the first wheel and control the second electric motor to control the rotational direction of the second wheel.

2. The animal toy of claim 1, wherein
   the first rotating member is coupled to the first motor via a reduction gear.

3. The animal toy of claim 1, wherein
   the first and second electric motors are disposed within the elongated body portion.

4. The animal toy of claim 1, wherein
   the opening in the first wheel is a one opening of a plurality of openings, and each of the plurality of openings being configured to enable food to pass therethrough.

5. The animal toy of claim 4, wherein
   the first wheel includes a plurality of axially extending members, and each of the plurality of openings being disposed between adjacent members of the plurality of axially extending members.

6. The animal toy of claim 1, wherein
the elongated body portion includes a protrusion configured to prevent rotation of the elongated body portion.

7. The animal toy of claim 1, wherein
the first and second rotating members are coupled to inner hub members of the first and second wheels, respectively.

8. The animal toy of claim 1, wherein
the first and second wheels are hollow wheels for containing food therein.

9. An animal toy comprising:
an elongated body portion having a first end and a second end;
a first wheel disposed on a first axle adjacent the first end, the first axle extending in a first axial direction, the first wheel having a first opening disposed in the first axial direction;
a second wheel disposed on a second axle adjacent the second end, the second axle extending in a second axial direction, the second wheel having a second opening disposed in the second axial direction, the first and second openings of the first and second wheels being configured to enable food to pass therethrough;
a first electric motor configured to drive the first wheel via the first axle;
a second electric motor configured to drive second wheel via the second axle; and
a controller programmed to control the first electric motor to control the rotational direction of the first wheel and control the second electric motor to control the rotational direction of the second wheel.

10. The animal toy of claim 9, wherein
the first axle is coupled to the first motor via a reduction gear.

11. The animal toy of claim 9, wherein
the first and second electric motors are disposed within the elongated body portion.

12. The animal toy of claim 9, wherein
the opening in the first wheel is a one opening of a plurality of openings, and each of the plurality of openings being configured to enable food to pass therethrough.

13. The animal toy of claim 12, wherein
the first wheel includes a plurality of axially extending members, and each of the plurality of openings being disposed between adjacent members of the plurality of axially extending members.

14. The animal toy of claim 9, wherein
the elongated body portion includes a protrusion configured to prevent rotation of the elongated body portion.

15. The animal toy of claim 9, wherein
the first and second axles are coupled to inner hub members of the first and second wheels, respectively.

16. The animal toy of claim 9, wherein
the first and second wheels are hollow wheels for containing food therein.

* * * * *